United States Patent [19]

Atwood et al.

[11] 3,954,339

[45] May 4, 1976

[54] ANGULAR SENSOR

[75] Inventors: John G. Atwood, Redding; Charles F. deMey, II, West Redding, both of Conn.

[73] Assignee: The Perkin-Elmer Corporation, Norwalk, Conn.

[22] Filed: Aug. 22, 1974

[21] Appl. No.: 499,595

[52] U.S. Cl. .............................. 356/152; 356/138; 350/96 R
[51] Int. Cl.² .................... G02B 27/24; G02B 5/14
[58] Field of Search .......... 356/138, 150, 151, 141, 356/152, 172; 250/227, 203 R; 350/96 R, 96 B, 102, 103

[56] References Cited
UNITED STATES PATENTS

| 3,079,835 | 3/1973 | Saperstein | 250/203 R |
|---|---|---|---|
| 3,277,304 | 10/1966 | Vyce | 356/150 |
| 3,574,466 | 4/1971 | Peters | 356/152 |
| 3,804,522 | 4/1974 | Smith | 356/150 |

FOREIGN PATENTS OR APPLICATIONS

| 1,063,873 | 3/1967 | United Kingdom | 356/138 |

OTHER PUBLICATIONS

Hazell et al., *Jour. Sci. Instr.*, Series 2, Vol. 2, 1969, pp. 110–111.

*Primary Examiner*—John K. Corbin
*Assistant Examiner*—Jon W. Henry
*Attorney, Agent, or Firm*—S. A. Giarratana; F. L. Masselle; J. K. Conant

[57] ABSTRACT

An annular position sensor employing optical fibers in pairs, one end of the fiber of each pair being associated with a single light source and the corresponding ends of the other fibers of each pair being associated with respective light detectors. The opposite ends of each pair of fibers terminate at mutually conjugate points with respect to, and on opposite sides of the focus of, a collimating lens element disposed to view a retro-reflector mounted on a rotational member to be monitored.

4 Claims, 3 Drawing Figures

ANGULAR SENSOR

BACKGROUND OF THE INVENTION

This invention relates to position sensors in general and more particularly to an improved angular position sensor particularly useful with automatic anaylsis apparatus.

In an application of John G. Atwood et al., Ser. No. 499,602, filed Aug. 22, 1974, and assigned to the same assignee as the present invention, a completely automatic kinetic analysis apparatus is disclosed wherein various drive motors are caused to rotate either in one or both directions to carry out a cycle of operation. It is essential that these motors be stopped at the exact same position after each cycle of operation. Reliance on precisely controlled timing signals will not provide sufficient accuracy for this purpose and because, over a period of time due to voltage tolerances, etc., the motors could come out of synchronism. Furthermore, this and other similar systems require sensors of high reliability and long life making the use of micro-switch sensors impractical.

SUMMARY OF THE INVENTION

The present invention contemplates apparatus for sensing the angular position of a rotational member which comprises a retro-reflector mounted on the rotational member and having an array of roof edges with the roof lines in a plane parallel to the axis of rotation of the member. A group of optical fibers is divided into pairs and a light detector provided for each pair. Each pair of fibers has a collimator unit including a collimating lens, each pair of fibers having its corresponding ends connected to a collimator unit with the ends at conjugates with respect to the focus of the lens. The opposite ends of one fiber of each pair is operatively coupled to a respective one of the light detectors and the opposite end of the other fiber of each pair is exposed to a source of light. The collimator unit is positioned with its lens viewing the retro-reflector and with the corresponding fiber ends disposed in a plane perpendicular to the axis of the rotational member.

DETAILED DESCRIPTION OF THE PREFERRED EMBODIMENT

The present invention provides such an accurate angular sensor for use in determining an angular position of a shaft, or other rotational member, which is particularly useful in automatic analysis apparatus.

Figure 1:
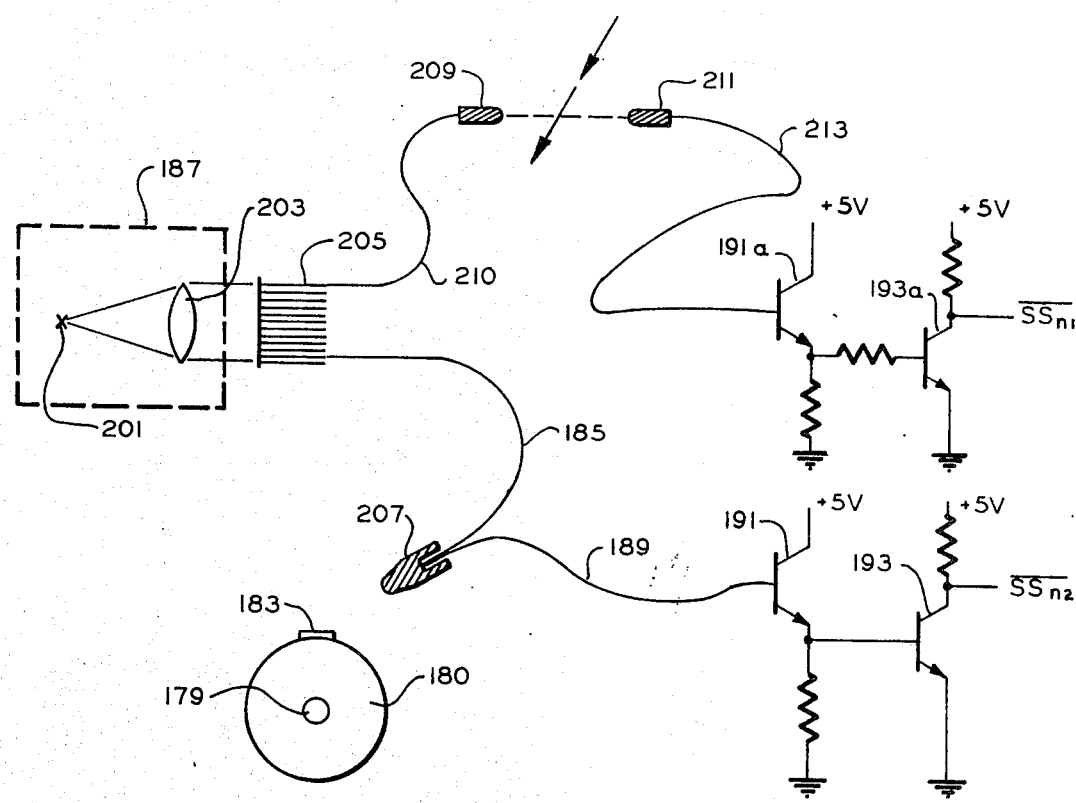
FIG. 1 is a schematic illustration of the angular sensor of the present invention in combination with linear sensors illustrating the manner in which a plurality of light sensors are activated by light from a common source.

The general opto-electric arrangement of the fiber optics in the system of the above-referenced application is illustrated in FIG. 1. As shown, an optical sensor source 187 comprising a light source 201 and a lens 203 focuses light on a bundle 205 of optical fibers. In that embodiment 38 light carrying fibers in all are used. For angle sensors such as those to be described herein, an optical fiber is brought to a collimator unit 207 which acts both as a light projector and receiver. Collimator unit 207 is directed to view a specific angular position on a disc or cam 180 associated with a motor shaft 179. A reflector 183, preferably a retro-reflector hereinafter described with greater particularity, is mounted on the disc 180.

A second optical fiber 189 is also inserted into the collimator unit 207 to pick up light reflected from reflector 183. Its other end is brought to a phototransistor 191, the output signal of which is coupled to an amplifier transistor circuit 193.

Also illustrated in FIG. 1 is the arrangement for detecting the presence of an object at a particular location (e.g., a sample cup or sample cup magazine in the system of the above-mentioned application). At each of the presence detection positions, a source lens unit 209 having one of the optical fibers, designated 210, from bundle 205 is positioned in opposition to a receiving lens unit 211. A fiber 213 from receiving lens unit 211 leads to another phototransistor 191a whose output signal is coupled to an amplifier transistor 193a. As indicated by the broken line and tandem arrow in FIG. 1, if nothing is interposed between source lens unit 209 and receiver lens unit 211, an output signal will be provided from transistor 193a. This output is indicated as $\overline{SS_{n1}}$ or in other words, the condition $SS_{n1}$ is not fulfilled, i.e., there is no object present in the monitored location. Once the light passage between units 209 and 211 is blocked, the phototransistor 191a and amplifier transistor 193a will be turned off and the state of the output will change.

Figure 2:
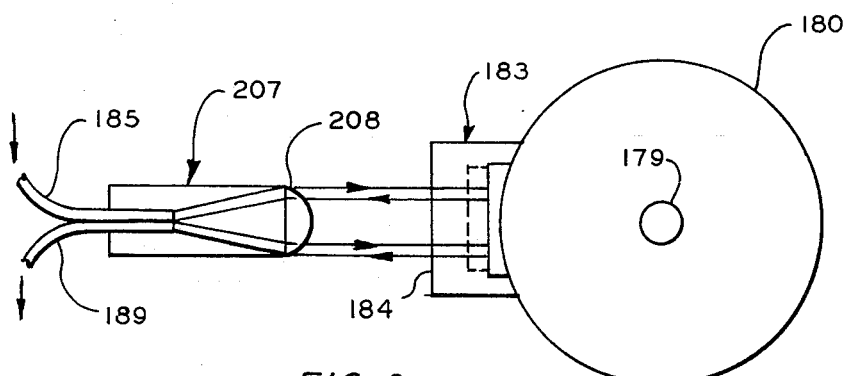
FIG. 2 is a plan view of the angular sensor of the present invention monitoring a rotational member having its axis of rotation perpendicular to the plane of the drawing.
Figure 3:
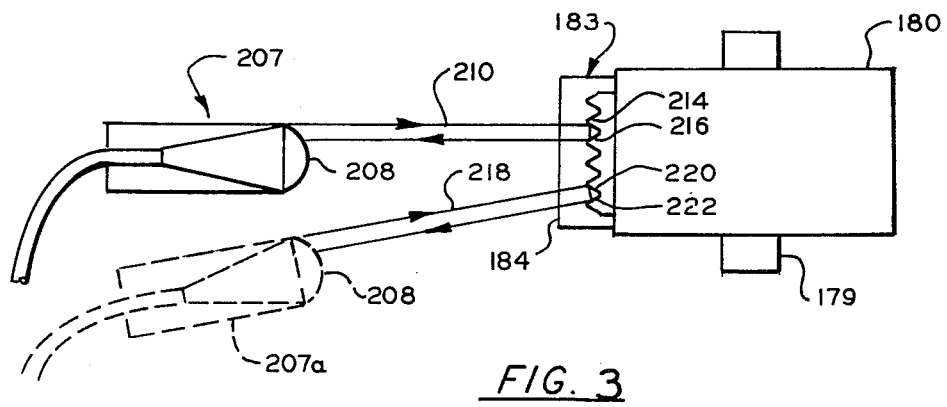
FIG. 3 illustrates the annular sensor of FIG. 2 as viewed with the axis of rotation of the monitored member lying in the plane of the drawing and demonstrating, by broken line structure, tolerable misalignment of the sensor.

The angular sensing arrangement of the present invention is shown in greater detail in FIGS. 2 and 3. The collimator unit or sensing terminal 207 consists of a small monolithic molded transparent plastic auto-collimator with provision for receiving two fibers, 185 and 189, cemented to it in such a way that the end of each fiber is at a point conjugate with the other fiber end on opposite sides of the focus of a lens formed on the unit by a spherical surface 208. As shown in FIG. 2, fibers 185 and 189 are arranged side-by-side and in a plane perpendicular to the axis of the shaft 179 of the rotational member to be monitored.

As indicated above, fiber 185 is the illuminating or transmitting fiber and fiber 189 the receiving fiber and the reflector 183 is preferably a retro-reflector. In FIG. 2 the reflector 183 is illustrated with arrows indicating the light being directed from collimator unit 207 to the mirror and back. The light is approximately collimated as it leaves the lens 208 and the same lens images the reflected light on the end of the receiving fiber 189. Only when reflector 183 is properly aligned with the optical axis of collimator unit 207 will a strong optical signal be transmitted which is then processed by the photodetector system 191, 193 as described above. The use of a retro-reflector as a mirror 183 avoids the need to control the angle of mounting of the reflector on the rotational member part in any plane other than that perpendicular to the axis of rotation of the rotating part, i.e., element 183 is made to function as a retro-reflector in a plane containing the axis of rotation, viz., the axis of the shaft 179.

FIG. 3 illustrates why the sensor is insensitive in other planes. As previously mentioned, in a plane parallel to the plane of that shaft 179 the mirror 183 is a retro-reflector. Preferably it is a molded transparent plastic part with a flat surface 184 facing collimator unit 207 and, on the side away therefrom, containing an array of flat surfaces forming V grooves acting as roof reflectors by total internal reflection. The roof edges are in a plane parallel to the axis of the shaft 179. In FIG. 3, collimator unit 207 is shown in full line in a perfectly oriented position and, in broken line and designated 207a to represent a maladjusted position. In the solid line position of unit 207, light from fiber 185 is collimated as it leaves the lens 208 and the ray 210 illustrated strikes a groove surface 214 of retro-reflector 183 where it is reflected to groove surface 216 and directed back to the lens 208 which then images it on the receiving fiber 189 (FIG. 2). However, because of the roof principle, even if collimator unit 207 is in the position of the collimator unit 207a operation will still take place in the desired manner. This is illustrated by the ray 218 which is reflected from groove surface 220 thence to the surface 222 and back to the lens 208. Thus, minor maladjustments of the positioning of the collimator unit 207 (or reflector 183) in the plane parallel to the axis of rotation causes no effect while the sensitivity to angular displacement in the plane perpendicular to the axis is essentially undiminished.

The optical design is such that the focal ratio of the auto-collimator is similar to that illuminated or accepted by the optical fibers but the focal length is chosen so that the diameter of the end of the optical fiber subtends a field angle in air about half the angle within which it is desired to sense the rotation of the rotating part.

The angular sensing system can be made unusually sensitive to angular rotation by making its field angle relatively small. Where it is desired to use the same diameter of optical fiber for all the sensors of FIG. 1 this can be achieved by making the focal length of the lens unit 207 relatively long. Because the reflected beams' angle changes at double the rate of rotation of the reflector and because the physical length of the auto-collimator is shorter than its focal lens in air by the ratio of the refractive index of the transparent material to the refractive index of air, the sensing system illustrated in FIGS. 2 and 3 can detect rotation to better than ± 1° sensitivity in an apparatus no longer than 3 centimeters using a 1 millimeter diameter fiber. It is particularly important that the rotating part does not need to have a large radius to achieve this sensitivity, i.e., the radius at which the reflector is mounted is of no importance and the distance from the auto-collimator unit 207 to the reflector 183 is not critical so long as too much vingetting does not occur. Because of the high directionality of the collimator units, on the sensing optical fibers, diffuse illumination from the environment is seldom a practical problem in the embodiment described since sufficient light does not enter the sensing terminals at precisely the right angles.

Thus an improved angular sensor particularly useful in automatic analysis apparatus has been shown. Although specific embodiments have been illustrated and described, it will be obvious to those skilled in the art that various modifications may be made without departing from the spirit of the invention which is intended to be limited solely by the appended claims.

What is claimed is:

1. Apparatus for sensing the angular position of a rotational member, comprising:
    a. a retro-reflector mounted on said rotational member and having an array of roof edges with the roof lines in a plane parallel to the axis of rotation of said member;
    b. a group of optical fibers divided into pairs;
    c. a light detector for each pair of optical fibers;
    d. a collimator unit for each pair of fibers, including a collimating lens, each pair of fibers having corresponding ends connected to said collimator unit with said ends at conjugates with respect to the focus of said lens, the opposite ends of one fiber of each pair being operatively coupled to a respective one of said light detectors and the opposite end of the other fiber of each pair being exposed to a source of light, said collimator unit being positioned with said lens viewing said retro-reflector and with said corresponding fiber ends disposed in a plane perpendicular to said axis.

2. Apparatus according to claim 1 wherein said collimator is a monolithic transparent plastic structure bonded to said corresponding ends of the optical fiber pairs.

3. Apparatus according to claim 2 wherein said source of light is common to all of said pairs of optical fibers.

4. Apparatus according to claim 3 wherein said retro-reflector is a monolithic transparent plastic structure having a planar surface parallel to said axis and facing said collimator lens, said array of grooves being formed on the reverse of said planar surface.

* * * * *